May 9, 1961 B. V. BALL 2,983,381
METAL OPENWORK SCREENS
Filed Feb. 25, 1957 4 Sheets-Sheet 1
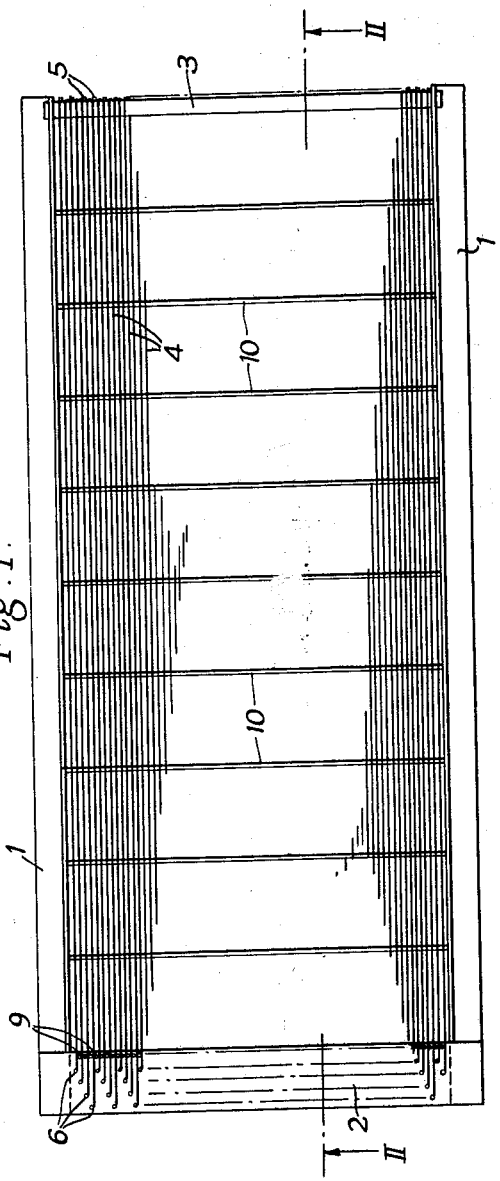
INVENTOR
Basil Victor Ball
BY
Stevens, Davis, Miller & Mosher
his ATTORNEY May 9, 1961  B. V. BALL  2,983,381
METAL OPENWORK SCREENS
Filed Feb. 25, 1957  4 Sheets-Sheet 2
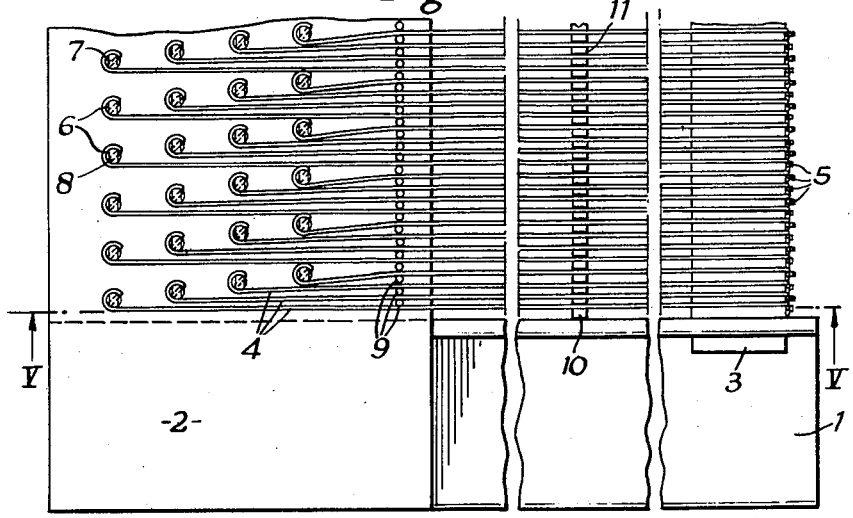
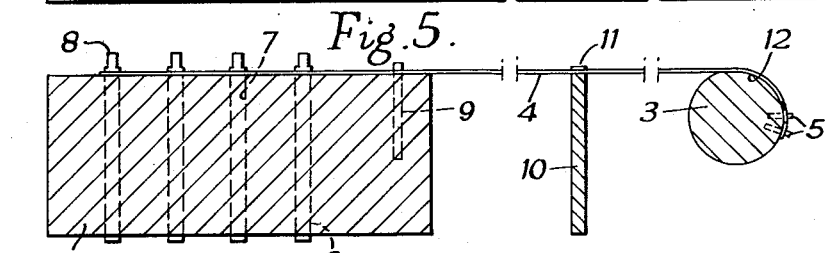
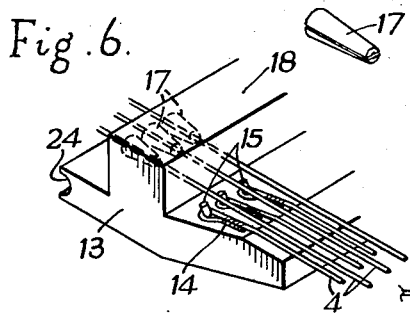
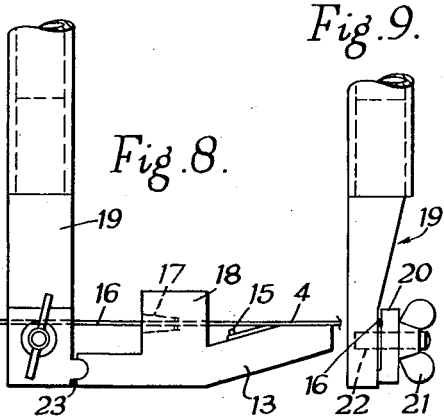
INVENTOR
Basil Victor Ball
BY
Stevens, Davis, Miller & Mosher
his ATTORNEYS May 9, 1961  B. V. BALL  2,983,381
METAL OPENWORK SCREENS
Filed Feb. 25, 1957  4 Sheets-Sheet 3
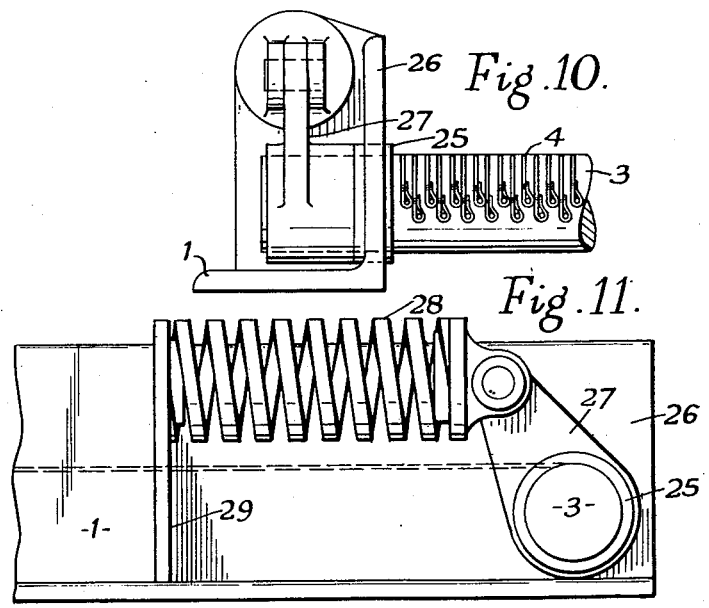
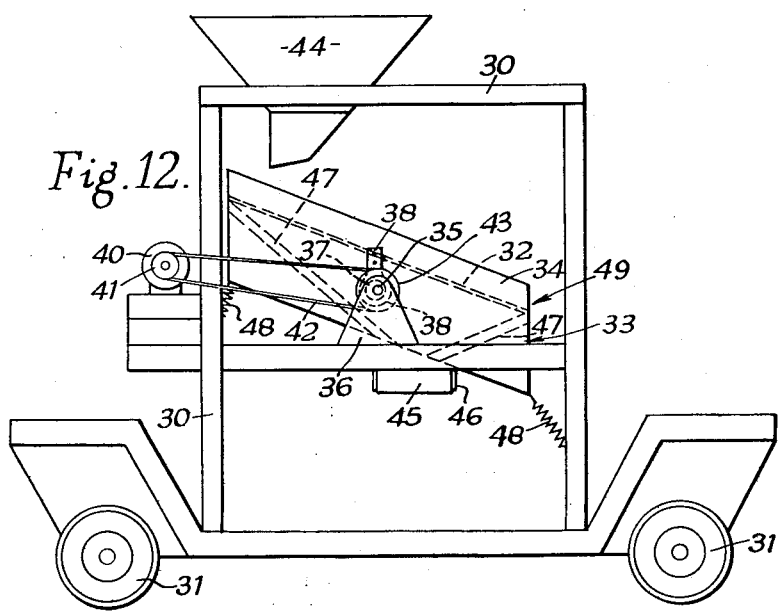
INVENTOR
Basil Victor Ball
BY
Stevens, Davis, Miller & Mosher
ATTORNEY May 9, 1961  B. V. BALL  2,983,381
METAL OPENWORK SCREENS
Filed Feb. 25, 1957  4 Sheets-Sheet 4

INVENTOR
Brian Victor Ball
BY
Stevens, Davis, Miller & Mosher
his ATTORNEYS

United States Patent Office 2,983,381
Patented May 9, 1961

2,983,381

METAL OPENWORK SCREENS

Basil Victor Ball, Hertford, England, assignor to H. Brazier Limited, Hertford, England Filed Feb. 25, 1957, Ser. No. 642,182

Claims priority, application Great Britain Feb. 28, 1956

2 Claims. (Cl. 209—400)

This invention relates to wire screens for use in the vibratory screening of builders' sand, gravel, small stones and all other loose materials which require classification on the basis of size.

Wire screens at present in use are almost invariably of the reticulated type formed by interlacing one series of parallel wires with another series angularly disposed thereto or by laying one set of parallel wires angularly across another set and forming a unitary screen by welding or soldering.

Numerous disadvantages are attendant upon the use of reticulated screens. In the first place, the ratio of open to closed area is relatively small. In the second place, the cross wires necessarily extending transversely of the flow of material over the screen constitute obstructions to which the finer-sized material adheres and forms numerous keys which result in the rapid clogging of the screen. This rapid clogging of reticulated screens, in turn, necessitates frequent shut downs for cleaning purposes, whilst the cleaning operation itself is perforce so severe that wire breakage is a frequent occurrence. When one or more wires in the screen breaks, the removal of the whole screen is necessary and a new screen must be fitted—an operation which is time-consuming and costly. It is seldom practicable to repair a broken screen so that a large stock of replacements must be kept available. To give an idea of the limited life of reticulated screens used for screening moist builders' sand, it may be stated that, in general, the most robust of such screens have an average life not exceeding about one month, the average life being considerably reduced when wires less than about 0.13" in diameter are used.

Non-reticulated parallel wire screens have also been proposed but none, so far as is known, has proved to be fully satisfactory in service notwithstanding the advantage of such screens in presenting a relatively large ratio of open to closed area.

It has now been discovered that non-reticulated parallel wire screens for use in vibratory screening operations can, in fact, give eminently satisfactory performance while overcoming all the defects enumerated above with respect to reticulated screens. In brief, it has been discovered that for the satisfactory performance of non-reticulated parallel wire screens, the wires must be capable of individual tensioning to a high degree and must in addition be supported and positively located at suitably chosen spaced intervals along their length whereby, during use in a vibratory screening apparatus or unit, the individual wires do not vibrate relative to the frame carrying the tensioned wires but do, in fact, constitute a rigid screening surface. Furthermore, the flow of material across the screen must be along the wires.

The present invention, therefore, provides a non-reticulated parallel wire screen for the vibratory screening of particulate materials which comprises a frame supporting a substantially planar, rigid, screening surface constituted by equispaced high tensile strength wires which, at spaced intervals along their length, are supported from below the screening surface and positively located in accurately spaced parallel relationship while allowing for each wire to be tensioned uniformly along its length, the frame being provided with a plurality of independently operable wire-tensioning devices whereby each wire may be tensioned individually. The face that, in the screen of the invention, each individual wire can be tensioned individually is of vital importance notwithstanding the additional structural complications involved. Such individual tensioning permits of all the wires to be tensioned to a maximum extent thus providing, in co-operation with the supporting means provided at intervals along the wires that, in use, the wires do not vibrate independently of the frame to which they are secured. If, in contrast, the wires are collectively tensioned as would be thought to be mechanically simple and convenient, it has been found that inadequate tension is applied to some of the wires with the consequence that the screen in fact is not rigid throughout in the sense that most of the wires flex in use and become displaced from accurate parallel relationship with the remaining wires thus resulting in inferior screening. Individual tensioning of the wires also permits of extremely rapid replacement of any broken wires and enables wires to be employed which are so thin as to have a desirable cutting effect on the material being screened, particularly on sticky or loamy material which tends to agglomerate.

In the screen of the invention, the only cross obstructions are the members employed for supporting and locating the wires at spaced intervals. However, such supporting and locating members need only be relatively few in number and can be designed to present a minimum of obstructing area, so that the material being screened can run freely over the screening surface in a direction parallel with the wires. In addition the fact that oversize material can take a virtually uninterrupted path down the slots defined by adjacent parallel wires, results in an automatic cleaning action on the wires.

The preferred type of wire material used in the screen is high tensile strength steel wire known as piano or music wire which has an extremely high ultimate tensile strength. In general, it is preferred that the wires should have an ultimate tensile strength of at least about 250,000 lbs. per sq. in., better still above 300,000 lbs. per sq. in. In use, the wires may be conveniently tensioned to at least 100,000 pounds per square inch. For best results the wires should have a diameter not exceeding 0.07" and a diameter of 0.04" has been found very satisfactory in use. The spacing between the wires will of course depend upon the material being screened; for screening builders' sand, a spacing between $\%_{32}$" and $\frac{1}{8}$" is eminently suitable. It is best that each wire is constituted by a single length of wire but if desired two adjacent wires may be formed from one continuous length provided each wire thus formed is provided with its own tensioning device. The individual tensioning of the wires is most conveniently achieved by the use of keys similar to those used in tensioning the wires of pianos. Such keys may be located in slightly undersized holes in a wooden block forming part of the screen frame. The keys may be cylindrical or tapered as desired. While tensioning devices could be employed at each end of each wire, this is unnecessary and for quick replacement of a wire, it is preferred that one end thereof be eyeletted and secured to a fixed pin on the frame, the other end of the wire being secured to the tensioning device.

The supporting and locating members for the wires preferably take the form of spaced rigid members extending transversely of the wires below the screening surface and at spaced intervals, each such member being provided with grooves serving to locate all the wires without interfering with the uniform tensioning thereof along their lengths. The spacing between the supporting members will, of course, vary, depending on the use to which the screen is put but the spacing should be as great as possible consistent with properly supporting and locating the wires. Desirably the spacing between supporting members will be at least 50 times the spacing between the wires so as to present the minimum of cross obstructions.

The frame to which the wires are secured may be of any convenient construction, but it is preferred that one end of the frame to which the wires are secured is such as to provide for the smooth and uninterrupted flow of particulate material over such end in a direction parallel with the wires. If the wires are to be heated by the passage of electrical current therethrough, means will be provided for taking up the elongation of the wires due to thermal expansion. For this purpose one of the frame members to which the wires are attached may be arranged to be movable as a whole preferably under the action of spring means.

As heretofore indicated, the screen of the invention is intended for use in vibratory screening apparatus. When so used, the screen will be used with the screening surface inclined to the horizontal in a direction parallel with the wires. Any of the known vibratory mechanisms may be used in conjunction with the screen but that preferred is a mechanism imparting an eccentric motion to the screen about an axis transverse to the wires. The screen of the invention may also be used in screening apparatus which is the non-vibratory type.

The invention will be better understood by reference to the accompanying drawing in which:

Fig. 1 is a general plan view of a parallel wire screen in accordance with the invention;

Fig. 2 is a section along lines II—II of Fig. 1;

Fig. 3 is a side elevation of the screen of Fig. 1 viewed from the right of Fig. 1;

Fig. 4 is a plan view of a portion of the screen of Fig. 1 on an enlarged scale and showing details of the mode of fixing and tensioning the wires;

Fig. 5 is a sectional view along lines V—V of Fig. 4;

Fig. 6 is a fragmentary perspective view showing a modified method of tethering and tensioning the parallel wires to the frame of the screen;

Fig. 7 is a perspective view of a conical tensioning member as used in the arrangement of Fig. 6;

Fig. 8 is an elevational view of the arrangement of Fig. 6 showing the mode of applying tension to the wires by means of a leverage tool;

Fig. 9 is a side view of the leverage tool shown in Fig. 8;

Fig. 10 is a fragmentary side view on an enlarged scale of the screen of Fig. 1 as seen from the right, and showing a modification;

Fig. 11 is a side view of the modification of Fig. 10, as seen from the left;

Fig. 12 is a front elevation of a mobile vibratory screening unit embodying a screen according to the invention and in which only those parts are shown which are germane to the invention;

Figure 13:
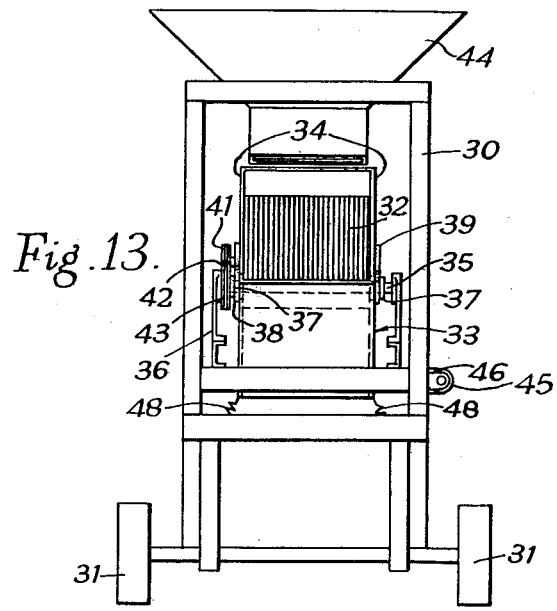
Fig. 13 is a side elevation of the unit of Fig. 12 as seen from the right.

Referring now to Figs. 1–5 of the drawings, the screen depicted comprises a rigid frame having angle-iron side members 1 and end members constituted respectively by a solid wooden block 2 and a metal bar 3 of circular cross-section. Suitable wood for the block 2 is that known as "cross beech"; the wood is best treated to render it resistant to the effects of moisture. Stretched between end members 1 and 2 are a series of parallel equispaced individual wires 4, each tethered at one eyeletted end to pins 5 in the bar 3 and at the other end to tensioning keys 6 located in slightly undersized holes in the block 2 wherein they are frictionally gripped. The tensioning keys 6 are each provided with a transverse hole 7 for insertion of the end of the wire for tensioning purposes and are also provided with rectangular heads 8 to afford a grip for a spanner or other tool. The wires 4 are maintained in properly spaced parallel relationship by means of a row of locating pins 9 and a plurality of spaced transversely extending metal plates 10 welded at their ends to the side members 1 of the frame and grooved at 11 to provide a guide channel for each wire. The bar 3 is also circumferentially grooved at 12 so as accurately to locate each wire on the surface of the bar without exerting such a clamping action on the wire as would interfere with the maintenance of a uniform degree of tension along its length. A slight camber is imparted to the screening surface made up of the wires 4, by virtue of the fact that the top surfaces of the cross-plates 10 are progressively raised towards the centre of the screen so that in fact the screening surface seen in section in Fig. 2 is slightly arcuate. This camber assists the maintenance of relatively rigid screening surface.

The wires 4 employed in the screen of Figs. 1–5 are of high tensile strength steel such as piano wire. For best results, the most satisfactory gauge for the wire has been found to be 19 S.W.G. (0.04" diameter) but if desired heavier gauge wire may be used, e.g. up to 16 S.W.G. (0.064" diameter), or lighter gauge wire depending on the fineness of the screening required. The spacing of the wires will of course depend on the material to be screened. To give an example, however, for the screening of ordinary builders' sand, the spacing will, in general, be between 1/8" and 3/32". In order to tension all the wires substantially equally and with great ease, a torque spanner may be employed, that is a spanner which slips beyond a certain predetermined torque. The spacing and number of the cross-plates 10 may of course vary, but a spacing of about 9" has been found satisfactory in practice for screening builders' sand. In any event, the number and disposition of the cross-plates 10 should be such as to avoid any flexing or sagging of the wires when the screen is normally loaded.

Instead of using the tensioning keys 6 shown in Figs. 1–5, there may be used split conical tensioning devices as shown in Figs. 6–9. In this case the end members 2 and 3 shown in Figs. 1–5 are each replaced by a shaped block 13 one at each end of the frame. One eyeletted end 14 of each wire is hooked on to a pin 15, while the other end 16 is clamped by a split conical tensioning device 17 located in a tapered hole in an upstanding portion 18 of the block 13. The clamping action is achieved by a levering tool 19 (Figs. 8 and 9) having a movable jaw 20 which can be clamped onto the wire by a wing nut 21 threaded on to a bolt 22. The tool 19 is provided with an arcuate projecting pivotal surface 23 which fits into a corresponding groove 24 in the block 13. To fix a wire in position in the screen, the eyeletted end 14 of the wire is looped over a pin 15 on one block 13 and the other end of the wire 16 is passed through an appropriate conical tensioning device 17 at the other end of the screen and is then clamped in the tool 19. Leverage is then exerted on the tool in the position shown in Fig. 8 until the desired tension has been applied to the wire. The tension is then merely released, whilst the conical tensioning device is in a snug position in its tapered hole, release of tenson causing the split tensioning device to be forced into its tapered hole so that it is compressed and grips the wire thus preventing further release of tension. The tool 19 can then be removed by unclamping the jaw 20.

The screen of the invention may, if desired, be heated by the passage of electric current through the wires. In this event, the wires will of course expand and, to take up the expansion, the bar 3 (of Figs. 1–5) may be spring-mounted as shown in Figs. 10 and 11. In Figs. 10 and 11, the bar 3 is rotatably mounted at each end in a bearing 25 secured to the upstanding flange 26 of the respective angle-iron side member 1. The ends of the bar 3 protrude through the bearings 25 and have secured thereto crank arms 27 which, as shown, are pivotally coupled to the free ends of compression springs 28 whose fixed ends abut and are located against an upstanding plate 29 welded to the angle-iron side members 1.

Figure 14:
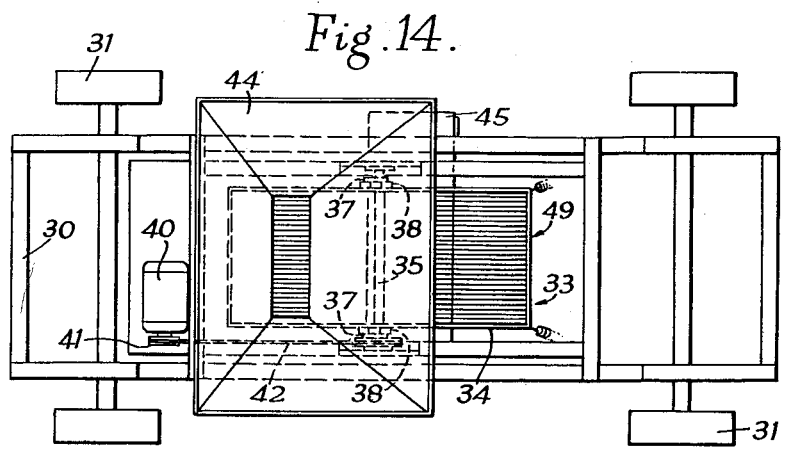
Fig. 14 is a plan view of the unit of Fig. 12.

The screen described above with reference to Figs. 1-5 and the modified versions thereof described with reference to Figs. 6-11, may be employed in any conventional vibratory screening unit, whether mobile or stationary, and one such conventional unit is shown in Figs. 12-14. In these latter figures, the vibratory screening unit is of the mobile type and comprises a rigid chassis, the various members of which are indicated by numeral 30 and which is mounted on wheels 31. The screen 32 is fixedly mounted in any convenient manner in a rigid box-like inclined frame 33 having side panels 34 through which a driven shaft 35 passes with ample clearance to accommodate the vibratory movement of the frame 33, the shaft 35 being mounted on standards 36. Vibratory movement is imparted to the frame 33 and hence to the screen 32 therein, by eccentric discs 37 secured to each end of shaft 35 and which impart an eccentric motion to straps 38 embracing the eccentric discs 37, and secured to the frame 33. The shaft 35 is driven by means of electric motor 40 having a pulley 41 which drives, through a belt 42, a pulley wheel 43 fast on shaft 35. When the electric motor is in operation, the frame 33 and screen 32 are subjected to an eccentric vibratory movement which includes a movement in a horizontal direction parallel with the wires of the screen 32. The chassis 30 of the mobile unit is fitted with a hopper 44 discharging into the upper feed end of screen 32 and with a transverse conveyor belt 45 mounted on rollers 46 driven in any convenient manner, the belt 45 serving to receive material passing through the screen and deflected onto its surface by inclined baffles 47. An additional conveyor belt, not shown, will usually be provided to carry away the material retained on the screen and rejected over the lower end 49 thereof. To stabilise the frame 33 during vibratory movement thereof, four tension springs 48 are provided at each corner, such springs being tethered at one end to some point on the main chassis 30.

Employing a screen such as is shown in Figs. 1-5 in conjunction with a vibratory screening unit similar to that of Figs. 12-14, it has been found that, using 0.04" diameter wires having a spacing of 1/8", screening time on builders' sand is reduced by as much as 100% compared with a conventional reticulated screen having square apertures of 1/4" lineal dimensions. This reduction in screening time is also accompanied by the production of a much finer grade material. Further, the maintenance of the screen of the invention could be effected cheaply and rapidly, it taking, on average, only about two minutes to replace any broken wire.

It will be understood that modifications may be made to the apparatus described with reference to the drawings. Thus, for example, referring to Figs. 1-5, each pair of adjacent wires may be formed from a continuous length of wire by looping the wire at one end over a single pin in bar 3. Also, other vibratory mechanisms may be used in place of that described with reference to Figs. 12-14. The construction of Figs. 1-5 represents a preferred embodiment of the invention owing to the simplicity thereof and also owing to the provision at the reject end of the screen, i.e. the end having the bar 3, of a smooth uninterrupted surface for the flow thereover of rejected material.

I claim:
1. A vibratory screening apparatus for screening granular material, said apparatus comprising a rigid chassis, a frame supported by the chassis for vibrational movement, said frame comprising a pair of rigid side bars, a first cross member at one end of the frame connecting the side bars, and a second cross member at the other end of the frame connecting said side bars, said second cross member having a smoothly curved supporting surface, said second cross member having pins thereon directed outwardly and downwardly from the frame, tensioning devices mounted on said first cross member in longitudinal alignment with said pins, a substantially planar, non-reticulated and rigid screening surface comprising parallel equally-spaced, high tensile strength wires connected between said pins and said tensioning devices, said frame and screen being inclined to the horizontal in a direction parallel with the wires with said second cross member lowermost, said second cross member being disposed below the screening surface to provide for smooth uninterrupted flow of a stream of particulate solid material off the lowermost end of the screen, at least one tensioning device being associated with each wire and said tensioning devices being independently operable, a plurality of spaced rigid supporting plates fixedly secured to the side bars and extending transversely of the wires and below the screening surface with their top edges in relative positions such as to impart a slight longitudinal camber to the screening surface, the top edge of each such wire supporting plate and the second cross member being provided with grooves longitudinally aligned and spaced to locate all the wires in equi-spaced parallel relationship throughout their length while permitting each wire to be tensioned uniformly along its length, the wires being stretched over the edges of the supporting plates under such tension as to be incapable of vibrating independently of the frame, means mounted on the chassis and connected to the frame for imparting an eccentric motion to the screening surface about an axis transverse to the wires and resilient means connecting the frame to the chassis for stabilizing the vibration of the frame around said axis.

2. A vibratory screening apparatus for screening granular material, said apparatus comprising a rigid chassis, a frame supported by the chassis for vibrational movement, said frame comprising a pair of rigid side bars, a first cross member at one end of the frame connecting the side bars, and a second cross member at the other end of the frame connecting said side bars, said second cross member being of circular cross-section and having pins thereon directed radially outwardly and downwardly from the frame, tensioning devices mounted on said first cross member in longitudinal alignment with said pins, a substantially planar, non-reticulated and rigid screening surface comprising parallel equally-spaced, high tensile strength wires connected between said pins and said tensioning devices, said frame and screen being inclined to the horizontal in a direction parallel with the wires with said second cross member lowermost, whereby to provide for smooth uninterrupted flow over its arcuately curved surface of a stream of particulate solid material, means for collecting and removing such material, at least one tensioning device being associated with each wire and said tensioning devices being independently operable, a plurality of spaced rigid supporting plates fixedly secured to the side bars and extending transversely of the wires and below the screening surface with their top edges in relative positions such as to impart a slight longitudinal camber to the screening surface, the top edge of each such wire supporting plate and the second cross member being provided with grooves longitudinally aligned and spaced to locate all the wires in equi-spaced parallel relationship throughout their length while permitting each wire to be tensioned uniformly along its length, the wires being stretched over the edges of the supporting plates under such tension as to be incapable of vibrating independently of the frame, means mounted on the chassis and connected to the frame for imparting an eccentric motion to the screening surface about an axis transverse to the wires, and spring means connecting the ends of the frame to the chassis for stabilizing the vibration of the frame around said axis.

References Cited in the file of this patent

UNITED STATES PATENTS

| | | |
|---|---|---|
| 639,699 | Adams | Dec. 26, 1899 |
| 784,584 | Myers | Mar. 14, 1905 |
| 810,682 | Shafer et al | Jan. 23, 1906 |
| 858,706 | Cunningham | July 2, 1907 |
| 887,580 | Black et al. | May 12, 1908 |
| 1,739,701 | Wilson | Dec. 17, 1929 |
| 1,999,673 | Weber | Apr. 30, 1935 |
| 2,533,788 | Geyer | Dec. 12, 1950 |

FOREIGN PATENTS

| | | |
|---|---|---|
| 4,714 | Great Britain | Feb. 24, 1913 |
| 368,026 | Great Britain | Mar. 3, 1932 |